United States Patent
Xia et al.

(10) Patent No.: US 11,836,160 B1
(45) Date of Patent: Dec. 5, 2023

(54) USER CUSTOMIZED PRIVATE LABEL PREDICTION

(71) Applicant: Amazon Technologies, Inc., Seattle, WA (US)

(72) Inventors: Wei Xia, Seattle, WA (US); Hao Chen, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1443 days.

(21) Appl. No.: 15/902,686

(22) Filed: Feb. 22, 2018

(51) Int. Cl.
```
G06N 20/00      (2019.01)
G06F 16/28      (2019.01)
G06N 3/08       (2023.01)
G06T 7/73       (2017.01)
G06F 18/24      (2023.01)
G06N 3/04       (2023.01)
```

(52) U.S. Cl.
CPC ............ *G06F 16/285* (2019.01); *G06F 18/24* (2023.01); *G06N 3/08* (2013.01); *G06N 20/00* (2019.01); *G06T 7/73* (2017.01); *G06N 3/04* (2013.01); *G06T 2207/20081* (2013.01); *G06T 2207/20084* (2013.01)

(58) Field of Classification Search
CPC ............ G06T 7/73; G06T 2207/20081; G06T 2207/20084; G06N 3/08; G06N 20/00
See application file for complete search history.

(56) References Cited

U.S. PATENT DOCUMENTS

| 10,025,950 | B1 * | 7/2018 | Avasarala | G06K 9/6223 |
| 10,824,942 | B1 * | 11/2020 | Bhotika | G06F 16/51 |
| 2012/0269436 | A1 * | 10/2012 | Mensink | G06K 9/00624 |
| | | | | 382/180 |
| 2017/0083792 | A1 * | 3/2017 | Rodriguez-Serrano | ...... |
| | | | | G06T 7/10 |
| 2018/0012110 | A1 * | 1/2018 | Souche | G06F 16/50 |
| 2019/0102646 | A1 * | 4/2019 | Redmon | G06K 9/4652 |
| 2019/0220694 | A1 * | 7/2019 | Biswas | G06K 9/6202 |

OTHER PUBLICATIONS

Wang et. al., "Learning Models for Object Recognition from Natural Language Descriptions", 2009 (Year: 2009).*
Kieffer et al., "Convolutional Neural Networks for Histopathology Image Classification: Training vs. Using Pre-Trained Networks", 2017 (Year: 2017).*
Wei et al., "HCP: A Flexible CNN Framework for Multi-Label Image Classification", 2016 (Year: 2016).*
Vogado et al., "Diagnosing Leukemia in Blood Smear Images using an Ensemble of Classifiers and Pre-trained Convolutional Neural Networks", 2017 (Year: 2017).*
Chen et al., "Visual-based Deep Learning for Clothing from Large Database", 2015 (Year: 2015).*

* cited by examiner

*Primary Examiner* — Selene A. Haedi
(74) *Attorney, Agent, or Firm* — Nicholson De Vos Webster & Elliott LLP

(57) ABSTRACT

Techniques for user customized private label prediction are described. According to some embodiments, customers can train a classifier to detect new objects in image data. These new objects may not be included in a base model provided by a service provider system. The base model can be utilized to perform object detection and feature extraction from training images that are annotated by the customer to identify the new objects. Once trained, the new custom model can be used to identify the new objects in input images and label the images accordingly.

20 Claims, 9 Drawing Sheets

USER CUSTOMIZED PRIVATE LABEL PREDICTION

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for user customized private label prediction are described. According to some embodiments, customers can train a classifier to detect new objects in image data. These new objects may not be included in a base model provided by a service provider system. The base model can be utilized to perform object detection and feature extraction from training images that are annotated by the customer to identify the new objects. Once trained, the new custom model can be used to identify the new objects in input images and label the images accordingly.

The pre-existing base model may have been trained to identify various objects based on a base dataset. The base dataset may include annotated image data for thousands of categories and/or subcategories of objects. The base dataset may include image data compiled by a service provider and/or image data from various public datasets, such as ImageNet, Coco, Pascal and others. The base dataset may include hundreds or thousands of images for each category or subcategory. Although the base model may be trained to identify a large number of objects, this training is not comprehensive, and may not include various types of objects specific to a given customer. Given these differences, the base model cannot be used to identify these customer-specific objects. However, many of the capabilities of the base model such as feature extraction and high-level feature detection can be used to train a new model that can identify the customer's objects using training data provided by the customer.

In some embodiments, the training data may include a few to tens of images (or more) for each custom category or subcategory to be trained. The training images may be iconic images, which show the object without the clutter of other objects or occlusion of the object (e.g., the iconic images may show a single "concept" of interest centered in the image, roughly axis aligned, and covering at least half of the area of the image). Each training image may be annotated (or "tagged") with a linguistic description of the object which may be used with the image data to create a custom model to identify the custom object in images.

Following the training of the custom model, embodiments enable custom categories of objects to be identified in an input image. In some embodiments, the custom model determines whether an object from the custom categories is visible (e.g., detection) in the image and if so, determine where in the image it is visible (e.g., localization). Once these regions have been identified, the image data can be analyzed to determine which category of object is visible (e.g., categorization). In some embodiments, a confidence value may also be provided for one or more of detection, localization, and categorization.

Figure 1:
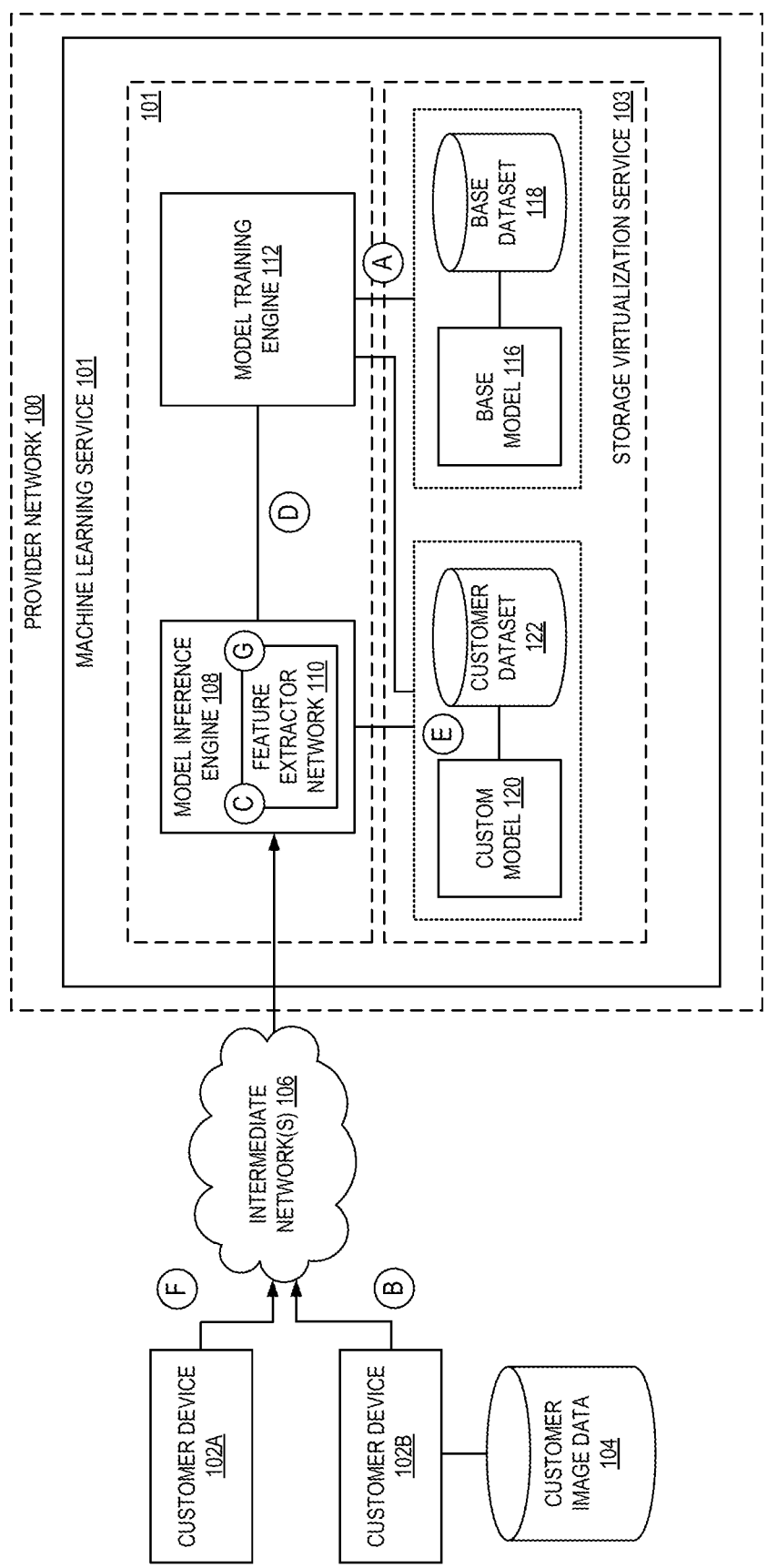
FIG. 1 is a diagram illustrating an environment for user customized private label prediction, according to some embodiments.

FIG. 1 is a diagram illustrating an environment for user customized private label prediction according to some embodiments. The environment may include a machine learning service 101 that can train and/or run machine learning models, for example, via a model training engine 112 component and a model inference engine 108, respectively. The machine learning service 101 may be a part of provider network 100, and can be implemented by software, hardware, or a combination of both hardware and software. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

As shown in FIG. 1, the machine learning service 101 can include a model inference engine 108, a model training engine 112, and a base model 116 and corresponding base dataset 118, though in some embodiments the machine learning service 101 includes the model inference engine 108 and the model training engine 112 while the base model 116 and corresponding base dataset 118 are stored in a storage virtualization service 103. Further, although these entities are shown as part of a machine learning service 101, these services and models may be implemented in one or more alternative networks in communication with the machine learning service 101. For example, features of the model inference engine 108 and model training engine 112 may be implemented on customer devices 102A and 102B or in other computing environments in communication with the customer devices 102 and/or machine learning service 101. Accordingly, the model inference engine 108 and the model training engine 112 can be implemented by software, hardware, or a combination of both software and hardware.

In various embodiments, at (A), base model 116 can be trained using base dataset 118. Base dataset 118 can include one or more image repositories which include structured and/or unstructured image data. For example, the image data may include representations of various objects, such as vehicles, consumer goods and devices, geographic features, etc. In some embodiments, each image is tagged based on the objects that are represented in that image. For example, an image of a city street may be associated with one or more category tags, such as a "device" tag, a "building" tag, a "fire hydrant" tag, etc. Each image may further be associated with one or more subcategory tags that are more descriptive than an associated category. For example, in addition to the "device" tag, additional tags indicating the type of device (e.g., smartphone, tablet computer, laptop, etc.), device manufacturer, and/or device model may also be included. The base model 116 may be trained using this tagged (e.g., annotated) dataset 118 and may be used to identify various objects in image data received from users, such as through customer devices 102. As will be described in more detail below, many other tags may be associated with an image.

In some embodiments, base model 116 can be implemented as one or more image classifiers, such as a neural network or other machine learning technique, that is designed to classify objects identified within image data. A neural network may include multiple of layers of nodes, including hidden layers. A hidden layer may include nodes that are linked with incoming and outgoing connections. These connections may be weighted. Data can be passed through these layers to generate an output of the neural network. Neural networks can learn as data is provided to them, adjusting the weights associated with the various connections each time new data is presented. Training the base model 116 based on the base dataset 118 may be performed iteratively. The neural network adjusts the weights to identify the correct category and/or subcategory of input samples. In some embodiments, training may include supervised and/or unsupervised training phases. As training data is passed through the base model, objects shown in the training data are classified. During supervised training, feedback on whether the objects have been correctly identified can be received from one or more computing devices or services.

In some embodiments, the correct classifications can be compared to the output of the neural network's final layer. Based on this comparison, differences between the output and the correct classifications can be back-propagated to previous layers of the neural network. This feedback can be modified based on a transfer function associated with the neural network and/or between these layers (e.g., using the derivative of the transfer function) and used to modify the weights associated with the connections. In some embodiments, a delta rule, such as a gradient descent learning rule, can be used to for updating the weights of the inputs to artificial neurons in a neural network. In some embodiments, training may use one or more machine learning libraries. As discussed, base dataset 118 may be used as the training set for training the base model. Base data set 118 may include image data that is representative of different categories and/or subcategories. Once the base model 116 has been trained, model inference engine 108 can use the base model to identify objects and/or features within input images and to identify the corresponding categories and/or subcategories.

During training of a neural network, one or more parameters (sometimes referred to as "hyperparameters") may be set, such as by a user or machine learning process. These hyperparameters may include hidden units, learning rate, momentum, weight, maximum norm, batch size, maximum tries, maximum iterations, etc. By adjusting these parameters, the amount of change to the neural network from feedback (e.g., changes to weights for the connections) can be increased or decreased. This may affect both how quickly the neural network learns the training material and how accurately the neural network performs. For example, momentum adds part of the previous weight to the current weight of a given connection. By adjusting the momentum, the neural network can avoid settling in a local minimum during training or missing the minimum during training.

As discussed, once the base model has been trained, it can be used to identify objects within input images. However, the base model is limited to identifying objects by the categories and subcategories for which it has been trained. Embodiments enable a customer to train a custom model that is trained to identify one or more custom categories and/or subcategories that the base model has not been trained to identify. For example, a customer device 102B with access to customer image data 104, can provide provider network 100 with annotated image data as shown at (B). In some embodiments, customer image data may include tens or hundreds (or more) of custom categories and/or subcategories, and each category or subcategory may be represented by tens or hundreds (or more) of representative images. The customer dataset may be a fraction of the size of the base dataset, which may include thousands or tens of thousands of images representing thousands of categories and/or subcategories. The customer image data can be stored in provider network 100, for example in customer dataset 122. As discussed above, the annotated image data may include tags for categories that are not built in to the base model.

Although the base model 116 has not been previously trained for the custom categories and/or subcategories specific to the customer, the base model may still be used to identify features of the objects shown in the customer image data 104. As discussed, when an image is presented to the base model for classification, the final output of the base model may be a vector of the various categories the base model has been trained to identify, with each category in the vector associated with a probability. The higher the probability, the more likely an object belonging to the corresponding category is represented in the image data. In some embodiments, the output vector may only include categories associated with probabilities above a threshold value. Rather than using the output vector of the base model, which is generated by the final layer of the base model, features identified by earlier layers in the base model may be used to train a new custom model 120.

Earlier layers in the base model may identify high-level features within the customer image data. For example, these features may include color feature descriptors, shape feature descriptors, texture feature descriptors, or other feature descriptors represented in the image data. As shown at (C), these features can be extracted by feature extractor network 110. In some embodiments, feature extractor network 110 can be a layer within base model 116 or a separate network, such as a region proposal network (RPN), neural network, or other machine learning algorithm. At (D), these features can be combined with the customer's annotations included in the customer image data for training customer model 120 by model training engine 112. In some embodiments, the model training engine may train a new model (e.g., custom model 120), may update base model 116 to include the custom categories and/or subcategories received from the customer, or may train any other image classifier or other machine learning algorithm to identify objects belonging to the custom categories. At (E), model training engine 112 may train the custom model similarly to the training of the base model described above.

Following training of the custom model 120, input images may be received from customer devices 102, or other electronic devices, as shown at (F). As discussed further below, these input images may include representations of the objects shown in customer image data 104 which custom model 120 has been trained to identify. As shown at (G), features of an input image can be extracted using feature extractor network 110. The custom model can be used (e.g., by model inference engine 108) to classify objects represented in the input images based on the extracted features, as further discussed below.

Figure 2:
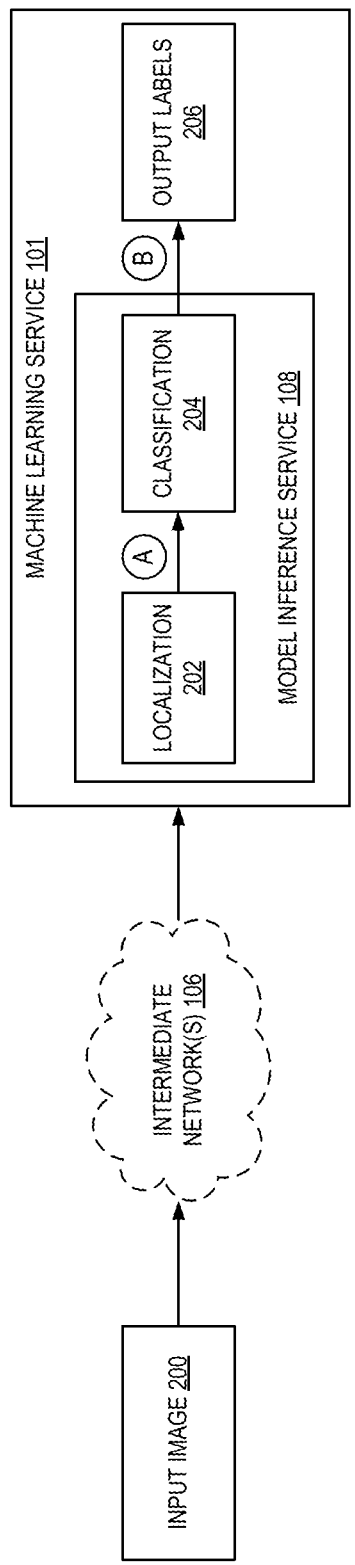
FIG. 2 is a diagram illustrating an environment for user customized private label prediction, according to some embodiments.

FIG. 2 is a diagram illustrating an environment for user customized private label prediction, according to some embodiments. As shown in FIG. 2, an input image 200 may be received by machine learning service 101 over one or more intermediate networks 106. In some embodiments, the input image 200 may be received from a data source or device directly, without being transmitted over intermediate network 106 (for example, from a data source within provider network 100). Machine learning service 101 may perform localization 202 and classification 204 on the input image and output labels 206 (e.g., tags) for objects represented in the image. In some embodiments, localization may be performed by model inference engine 108 and classification may be performed by custom model 120 (which itself may be executed by model inference engine 108). As used herein, localization may refer to a process by which objects of interest are identified within an image. For example, an input image 200 may include various objects represented therein. For example, an image of a cafe may include representations of people, tables, chairs, electronic devices, etc. Localization can identify regions of the image data and associate each region with a probability that indicates the likelihood that those regions include an object. The regions may be limited by threshold values (e.g., to be identified as a region, it must be larger than a threshold value). The object identified in the regions may be defined generically at a high level (e.g., person, animal, device, etc.), rather than the specific identification that follows classification. In some embodiments, localization 202 may be skipped. For example, input images that show a single object (e.g., an "iconic" image) may not require localization.

In some embodiments, various localization techniques may be used, such as a region proposal network (RPN) from a region-based convolutional neural network (or "R-CNN", such as a "Fast R-CNN" or "Faster R-CNN" implementation), detectors such as single shot detection (SSD) or deeply supervised object detectors (DSOD), or attention models. Regardless of the localization method used, at (A), the outputs of localization methods may each include a bounding box and a confidence score for a type of object in the box. In some embodiments, each region having a confidence score above a threshold value may be further analyzed to extract features of the object represented in that region. A recurrent neural network (RNN), such as a long short-term memory (LSTM) network can be used to learn the region of interest (ROI) from the identified regions and generate a template feature representation from the customer image data.

Following localization 202, classification 204 may be performed on the output bounding box regions to train the new custom model. In various embodiments, classification 204 may use classification embedding or verification embedding. In classification embedding, the base model may be used to extract features from the localized regions. As an example, the customer image data may include ten annotated images of Apple iPhone Xs® and ten annotated images of Samsung Galaxy S8s®. Features from each image can be extracted using the base model. As discussed, these features may be high level features, extracted from a layer of the base model prior to the final layer. The images may then be stored with their annotations and extracted features and used to train the custom model. When a test image (e.g., an image that has not been annotated) is received, the base model can be used to extract features from the test image, and those features can be run through an identification algorithm (e.g., k-nearest neighbor (KNN)) to determine whether those extracted features are closer to the iPhone training images or the Galaxy training images. At (B), the label or labels corresponding to the nearest neighbors can be provided as output labels 206 and applied to the input image 200.

Additionally, or alternatively, classification 204 may use a verification embedding. Verification embedding may use a verification network (e.g., Margin_loss/Prototypical, etc.) and an identification algorithm (such as KNN), to determine whether an image includes a representation of an object belonging to a custom classification. A verification network can be trained using the customer image data. The verification network can receive two or more images (and/or the features of two or more images) and output a value that indicates whether the images include representations of the same object. Using a verification network does not identify what the object is, but instead indicates whether the multiple images are of the same object. Using an image of a known object and a test image, the verification network can indicate whether the test image includes a representation of the known object. In some embodiments, the base model can be used to train the verification network. For example, the categories in the base model can be used to generate pairs or triplets of objects. When these pairs or triplets of images are selected from the base dataset, some will include representations of the same object and some will include representations of different objects. Since the base dataset includes known objects, the verification network can then be trained to determine whether these pairs or triplets are the same or different.

Similarly, the customer dataset may be used to update the trained verification network, or to train a new verification network, based on the annotated images in the customer dataset. When a test image is received, the verification network trained using the customer dataset can output a value indicating whether the object represented in the image is the same as an object shown in the customer dataset. For example, the verification network can receive one or more features from the test image and determine whether those features are the same as those of a first object represented in the customer dataset. If the features are the same, the verification network can output a binary value indicating a match. If the features are not the same, the verification network can output a binary value indicating no match and proceed to analyze the features from the test image in view of those of a second object represented in the customer dataset. If there are k objects represented in the customer dataset, the verification network can analyze the test image features up to k times, serially analyzing the test image features against the objects represented in the customer dataset. The value may be a binary value (e.g., match or no match) or may represent a confidence value that the test image includes the same object as an image from the customer dataset. At B, the verification network can provide one or more output labels 206 (e.g., tags) to be associated with the input image 200 corresponding to the tag or tags of the matching image(s) from the customer dataset (e.g., the image or images from the customer dataset having the highest confidence value).

Figure 3:
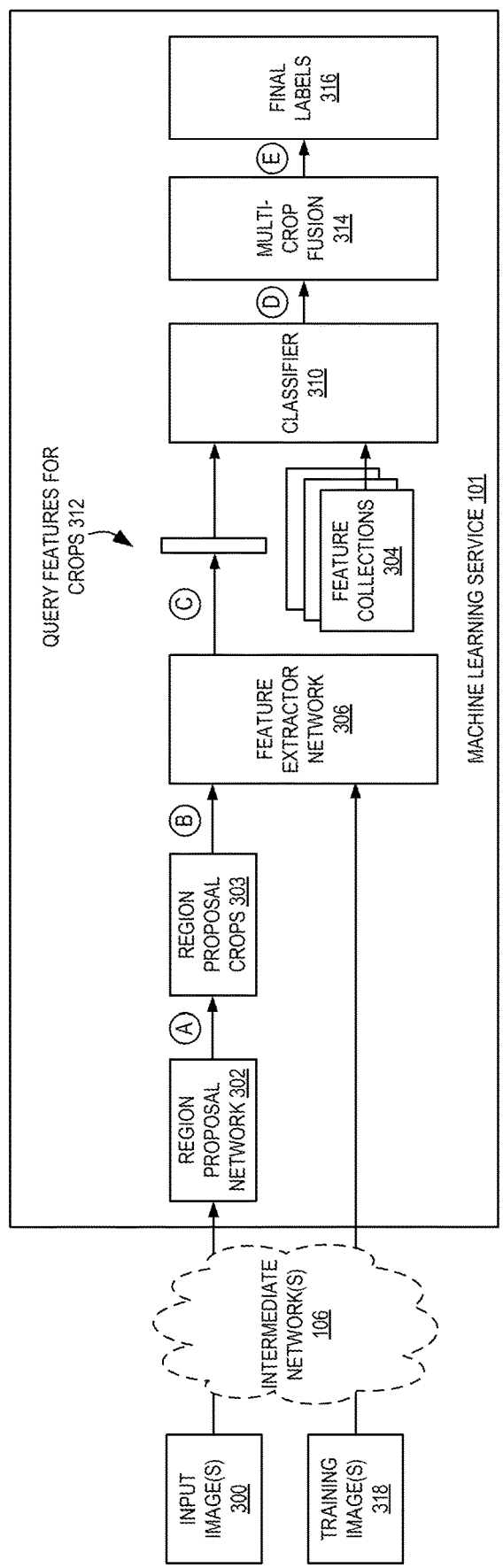
FIG. 3 is a diagram illustrating an environment for user customized private label prediction, according to some embodiments.

FIG. 3 is a diagram illustrating an environment for user customized private label prediction, according to some embodiments. FIG. 3 shows an environment for training a custom model using one or more training images 300. As shown in FIG. 3, an input image 300 and/or a training image 318 may be received by machine learning service 101 over one or more intermediate networks 106. In some embodiments, the input image and/or training image 318 may be received from a data source or device directly, without being transmitted over intermediate network 106 (for example, from a data source within provider network 100). Training images 318 can be received by feature extractor network 306. Feature extractor network 306 can be trained to be general enough to cover a semantic space that can include customized labels received from a customer. As discussed, a customer can provide training images 318 which include representations of objects and annotations identifying the objects. As these images are typically iconic (e.g., the image only includes a representation of the identified object), the training images can be passed to feature extractor network 306 without first performing localization. The feature extractor network 306 can identify various features of the object represented in the training images. As discussed, the object's features may include various feature descriptors such as color feature descriptors, shape feature descriptors, texture feature descriptors, or other feature descriptors represented in the image data. These feature descriptors and the training image tags can be stored in feature collections 304. The features and corresponding annotations may then be used to train a classifier 310 (e.g., a custom model), as discussed above.

Once trained, the custom model can be used to identify custom objects in images, such as input images 300, that include various clutter (e.g., other objects, partial occlusion, etc.). As discussed, to identify the object in an image, the base model and one or more localization techniques, such as a region proposal network (RPN) 302, may be used to perform region identification. In some embodiments, to be identified, the object must occupy a portion of the image greater than a threshold value. At (A), the output of the RPN may include one or more bounding boxes within the input image which include an object. In some embodiments, an output bounding box may be associated with a confidence value, indicating the likelihood that an object is included in the bounding box. If the confidence interval is above a threshold, region proposal crops 303 can crop the portions of the input image covered by the bounding box. At (B), each cropped portion of the input image may then be passed to feature extractor network 306. In some embodiments, each cropped portion may be separately analyzed, and a separate feature vector may be generated for each cropped portion. The feature vector may include each extracted feature descriptor from a given cropped portion. At (C), one or more feature vector may be output from each cropped region of the input image.

At 312, previously identified features in the custom model and/or base model in feature collections 304 can be queried for the crops. The feature vectors from the cropped portion(s) of the input image and the queried features from feature collections 304 may then be processed by classifier 310. Classifier 310 can be the custom model trained using the customer image data. As discussed, this may include a classification embedding or a verification embedding, or a combination of the two. As discussed, in classification embedding, when an input image 300 (e.g., an image that has not been annotated) is received, the base model can be used to extract features from the test image, and those features can be run through an identification algorithm (e.g., k-nearest neighbor (KNN)) to determine which custom category those extracted features are closest to. The categories associated with the nearest neighbors may be output as a vector at D for each crop being analyzed. Additionally, or alternatively, classifier 310 may use a verification embedding. As discussed, verification embedding may use a verification network (e.g., Margin_loss/Prototypical, etc.) trained using the customer image data and an identification algorithm (such as KNN), to determine whether an image includes a representation of an object belonging to a custom classification. The verification network can compare the features of the input image 300 to the features extracted from the training images to determine whether the input image includes a representation of the same object as a is shown in a training image. For example, if there are k objects represented in the customer dataset, the verification network can analyze the input image features up to k times, serially analyzing the input image features against the objects represented in the customer dataset. As discussed, the base model can be used to train the verification network. For example, the categories in the base model can be used to generate pairs or triplets of objects. When these pairs or triplets of images are selected from the base dataset, some will include representations of the same object and some will include representations of different objects. Since the base dataset includes known objects, the verification network can then be trained to determine whether these pairs or triplets are the same or different. Regardless of which embedding or combination of embeddings are used, the output of classifier 310, shown at (D), is a vector of categories corresponding to the features of the cropped portion of the input image.

As discussed, each input image may include multiple objects, resulting in multiple cropped regions being analyzed. Multi-crop fusion 314 can combine the results of each cropped region to generate final labels 316. For example, multi-crop fusion 314 may use max pooling to determine the final labels. In one example, an input image 300 may include two regions, each showing a representation of an object. For the first region, the classifier may output a vector including the label "cat" with a confidence value of 0.9 and, for the second region, the classifier may output a vector including the label "cat" with a confidence value of 0.1. Using max pooling, the maximum confidence value may be selected from each region. Since the first region has a confidence value of 0.9 for "cat," the image can be tagged with "cat" based on the 0.9 value. Alternative fusion methods may also be used, such as average pooling or voting. At (E), a vector including final labels 316 is output by multi-crop fusion 314 based on the pooling.

Figure 4:
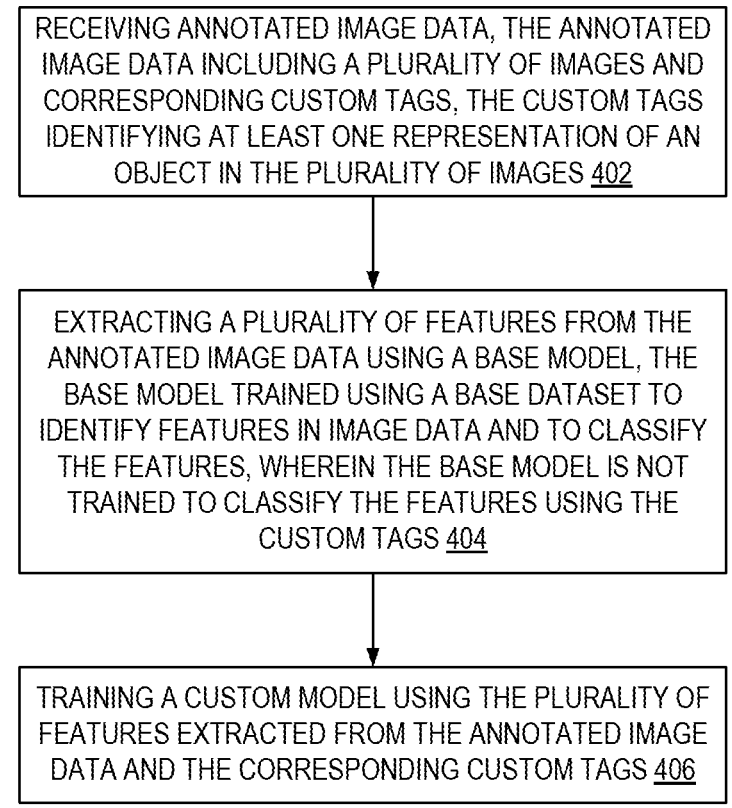
FIG. 4 is a flow diagram illustrating operations for user customized private label prediction according to some embodiments.

FIG. 4 is a flow diagram illustrating operations 400 for user customized private label prediction according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the machine learning service 101 (e.g., model inference engine 108 and/or model training engine 112) of the other figures.

The operations 400 include, at block 402 receiving annotated image data, the annotated image data including a plurality of images and corresponding custom tags, the custom tags identifying at least one representation of an object in the plurality of images. The annotated image data can include customer image data. The customer image data can include a plurality of images including representations of a plurality of objects. Each image of the plurality of image includes at least one custom tag identifying an object from the second plurality of objects. In some embodiments, the plurality of images and corresponding custom tags may be stored in the provider environment and/or machine learning environment for use in training.

The operations 400 include, at block 404 extracting a plurality of features from the annotated image data using a base model, the base model trained using a base dataset to identify features in image data and to classify the features, wherein the base model is not trained to classify the features using the custom tags. In some embodiments, the base model comprises a neural network classifier trained using a base dataset to identify a first plurality of objects in image data. In some embodiments, the customer image data can include representations of a second plurality of objects that is different from the first plurality of objects.

The operations 400 include, at block 406 training a custom model using the plurality of features extracted from the annotated image data and the corresponding custom tags. tag.

In some embodiments, during a testing phase, an input image can be received. The input image can include a test image or any other image showing at least one object that the custom model has been trained to classify. At least one object in the input image can be identified and a bounding box can be associated with the at least one object in the input image. In some embodiments, a region proposal network, single-shot detection (SSD), or a fully convolutional network (FCN) can be used to identify the bounding box. The region proposal network, SSD, or FCN may identify proposed regions and corresponding bounding boxes that are larger than a threshold size (e.g., than a specific portion of the image area). The portion of the input image corresponding to the bounding box can be cropped, and at least one feature from the portion of the input image can be extracted using the base model. The input image can then be classified using the at least one feature extracted from the portion of the input image and the custom model.

In some embodiments, using a classification embedding, classification can include processing the at least one feature by the custom model to identify a closest neighbor using a k-nearest neighbor algorithm, random forest algorithm or neural network, and labeling the test image with a custom tag corresponding to the closest neighbor. In some embodiments, using a verification embedding, classification can include analyzing the at least one feature by the custom model, wherein the custom model is a verification network that determines whether the at least one feature matches features of each object from the first plurality of object serially until a match is found or all of the first plurality of objects have been analyzed. An output vector can be received from the custom model, the output vector including a value for at least one custom tag, the value indicating that the at least one object is the same as an object corresponding to the at least one custom tag. The test image can then be labeled with the custom tag. In some embodiments, the output vector may include values for a plurality of the custom tags and the test image may be labeled with the custom tag having the highest value.

In some embodiments, where an image includes representations of multiple objects, a plurality of classification vectors may be received, each corresponding to a different portion of the input image, and each classification vector including at least one classification tag and a corresponding confidence value. The plurality of classification vectors can be pooled, wherein pooling includes labeling the input image with the at least one classification tag from each classification vector based on the confidence values. Pooling can include one of maximum pooling, average pooling, or voting.

Figure 5:
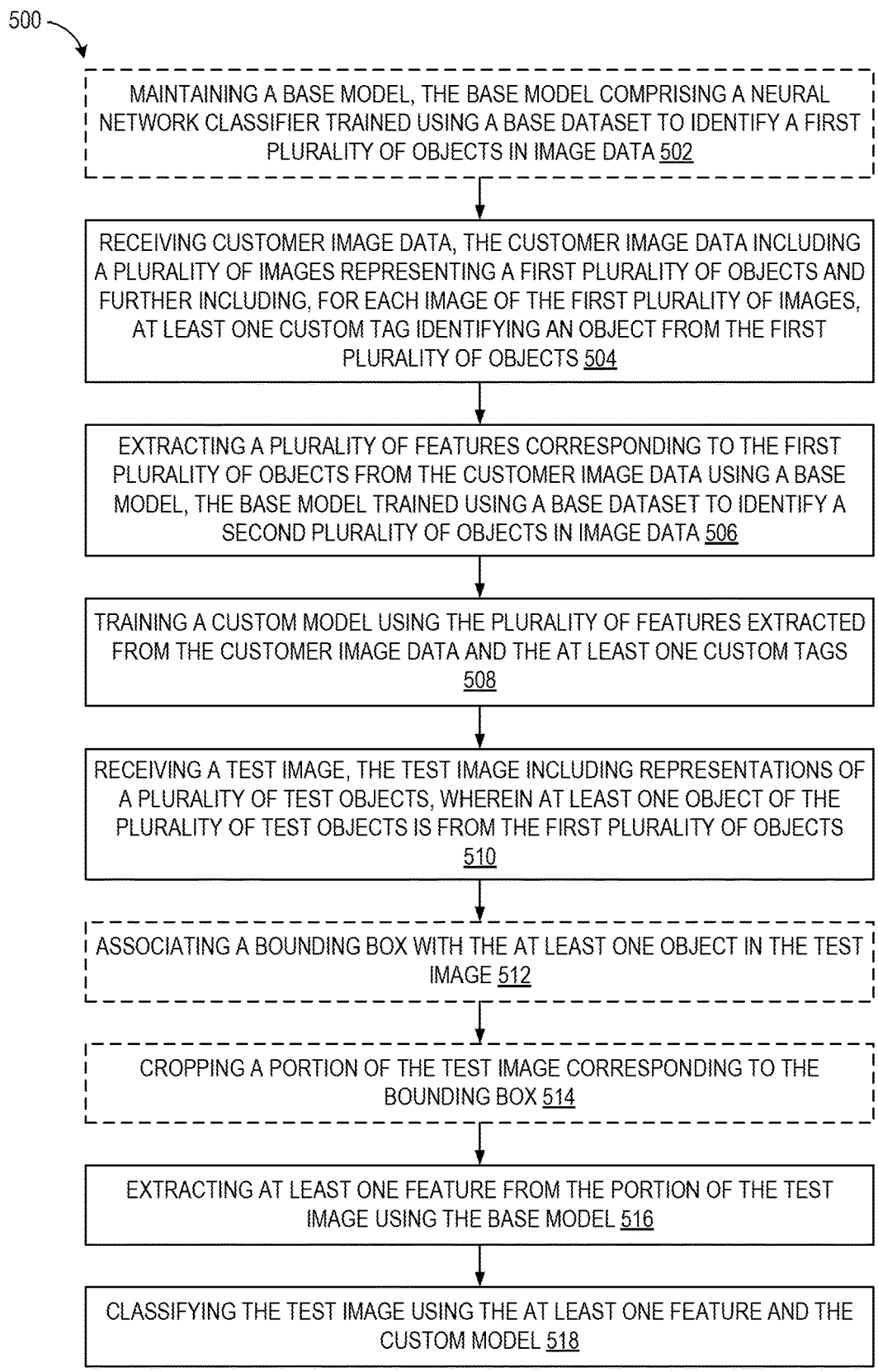
FIG. 5 is a flow diagram illustrating operations for user customized private label prediction according to some embodiments.

FIG. 5 is a flow diagram illustrating operations 500 (e.g., of a method) for user customized private label prediction according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 (of a method) are performed by the machine learning service 101 (e.g., model inference engine 108 and/or model training engine 112) of the other figures.

The operations 500 include, at block 502 maintaining a base model, the base model comprising a neural network classifier trained using a base dataset to identify a first plurality of objects in image data. At block 504, receiving customer image data, the customer image data including a plurality of images representing a first plurality of objects and further including, for each image of the first plurality of images, at least one custom tag identifying an object from the first plurality of objects. At block 506, extracting a plurality of features corresponding to the first plurality of objects from the customer image data using a base model, the base model trained using a base dataset to identify a second plurality of objects in image data. At block 508, training a custom model using the plurality of features extracted from the customer image data and the at least one custom tags. At block 510, receiving a test image, the test image including representations of a plurality of test objects, wherein at least one object of the plurality of test objects is from the second plurality of objects. At block 512, associating a bounding box with the at least one object in the test image. At block 514, cropping a portion of the test image corresponding to the bounding box. At block 516, extracting at least one feature from the portion of the test image using the base model. At block 518, classifying the test image using the at least one feature and the custom model. As shown in FIG. 5, the operations shown at blocks 502, 512, and 514 may be optionally performed with the other operations shown.

Figure 6:
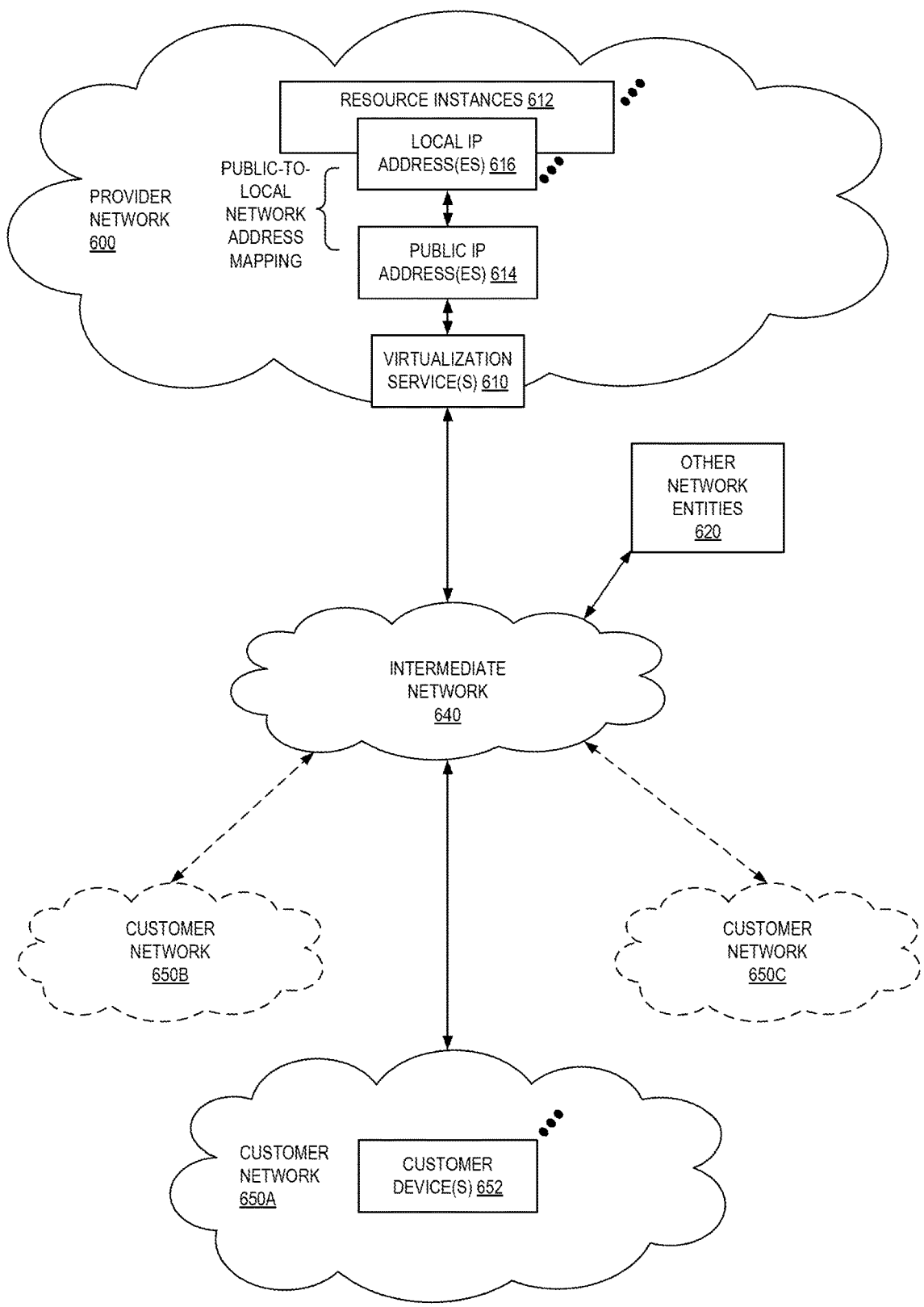
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
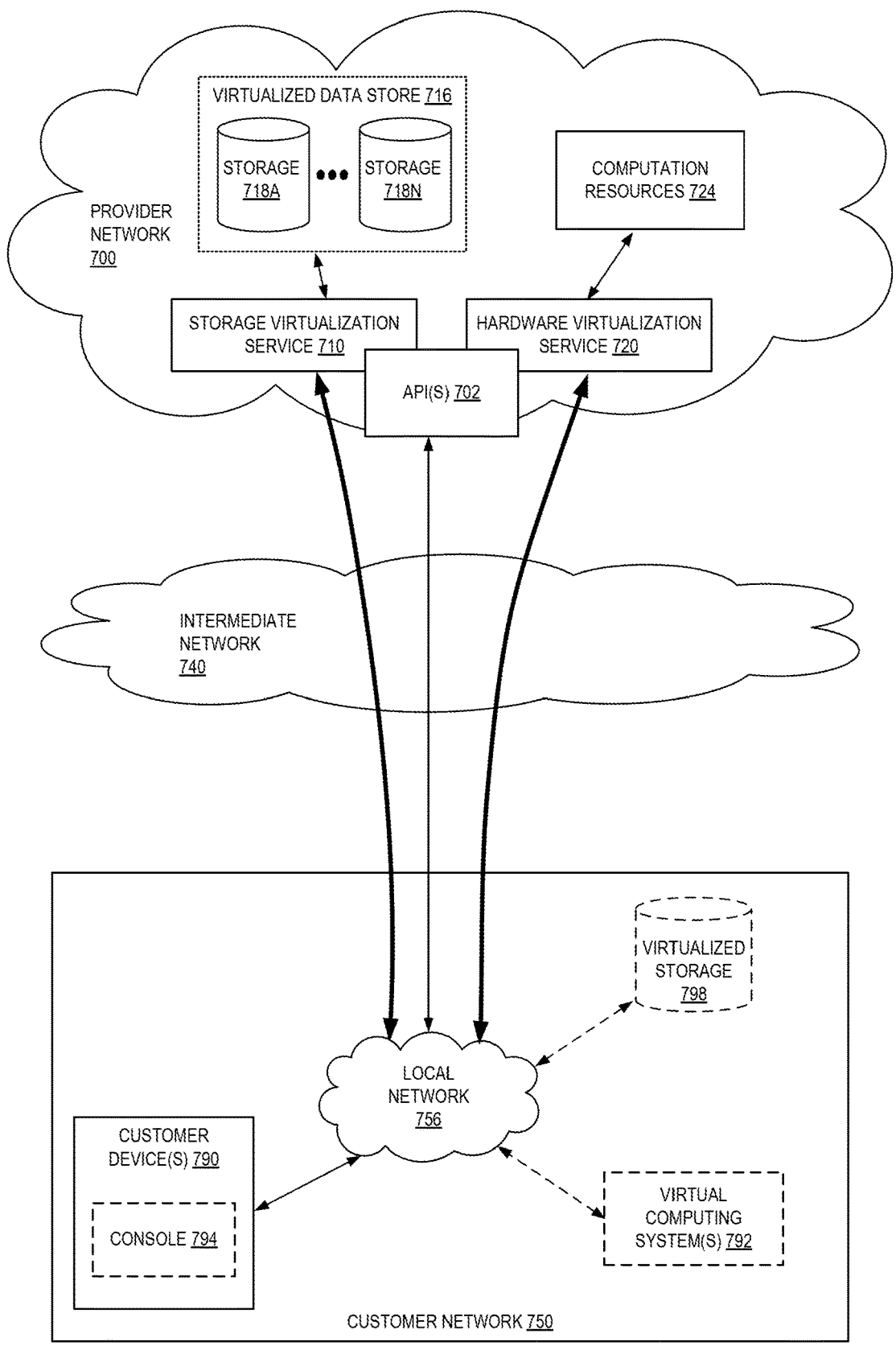
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
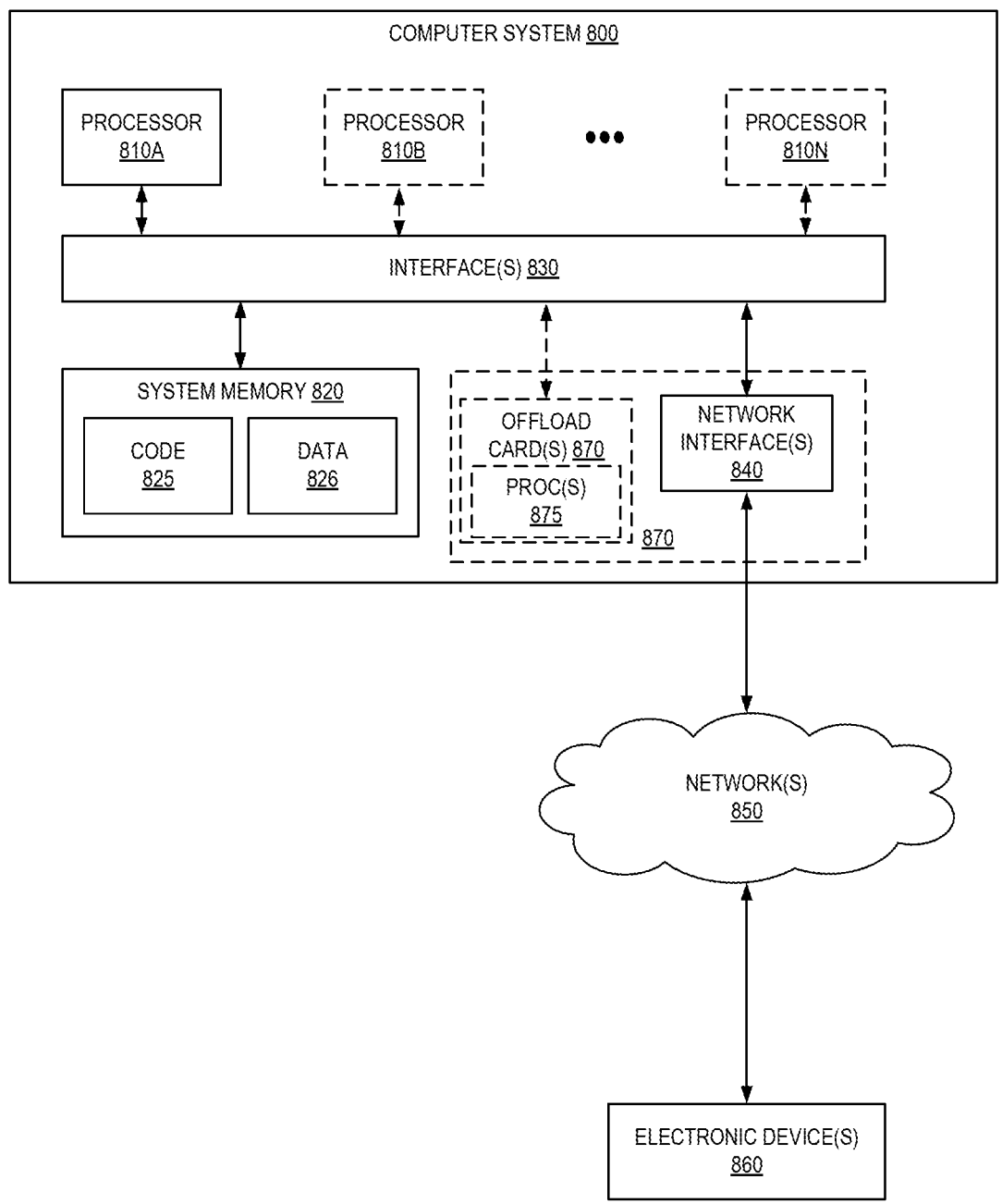
FIG. 8 is a block diagram illustrating an example computer system that may be used in some embodiments.

In some embodiments, a system that implements a portion or all of the techniques for user customized private label prediction as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities, and may not coordinate with (or service) any hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
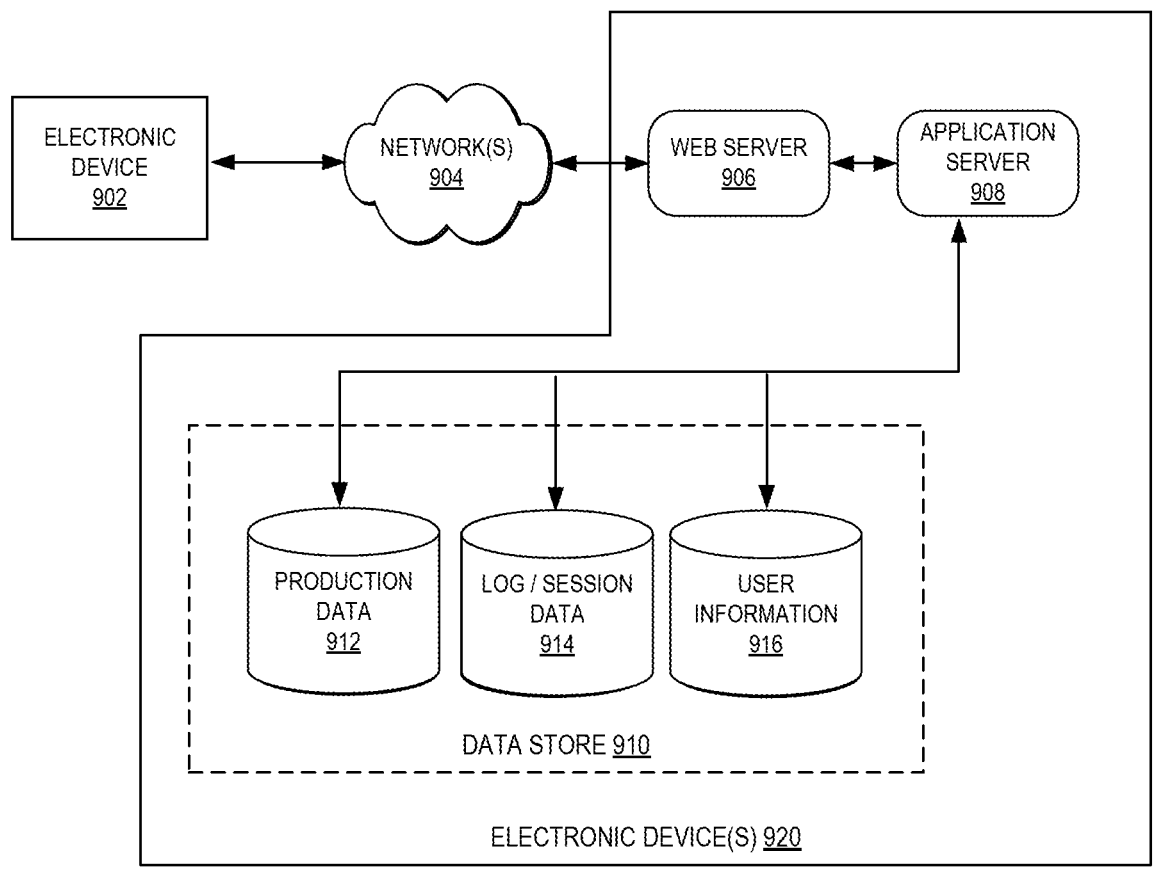
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments image data may be transferred via HyperText Transfer Protocol (HTTP) requests that are received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), APPLETALK®, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as JAVA®, C, C#, or C++, or any scripting language, such as PERL®, PYTHON®, PHP, or TCL, as well as combinations thereof. The server(s) may also include database servers, including without limitation those commercially available from ORACLE®, MICROSOFT®, SYBASE®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A and 102B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a model inference engine, customer image data, the customer image data including a plurality of images representing a plurality of objects belonging to a custom set of categories, and further including, for each image of the plurality of images, at least one custom tag identifying an object from the plurality of objects;
   extracting, by a feature extractor network of the model inference engine, a plurality of features corresponding to the plurality of objects from the customer image data, wherein the feature extractor network comprises one or more hidden layers of a base model that has not been trained to identify objects belonging to the custom set of categories, the base model having been trained according to a machine learning training process by processing a base dataset including image data passed to the base model as input data and providing as output from the base model identification of one or more objects, in the image data, belonging to a base set of categories that does not include the custom set of categories;
   combining, by a model training engine, the plurality of features extracted by the one or more hidden layers of the base model from the customer image data with the at least one custom tag identifying an object from the plurality of objects to generate combined training data;
   generating a custom model by training the base model using the combined training data;
   receiving a test image, the test image including representations of a plurality of test objects, wherein at least one object of the plurality of test objects belongs to a category of the custom set of categories;
   extracting, by the feature extractor network of the model inference engine, at least one feature from a portion of the test image; and
   passing, into the custom model, input data comprising the test image and the at least one feature extracted by the feature extractor network of the model inference engine to obtain, as output from the custom model, a classification of the test image.

2. The computer-implemented method of claim 1, wherein classifying the test image using the at least one feature extracted by the feature extractor network of the model inference engine and the custom model comprises:
   processing the at least one feature by the custom model to identify a closest neighbor using a k-nearest neighbor algorithm, random forest algorithm, or neural network; and
   labeling the test image with a custom tag of the at least one custom tag corresponding to the closest neighbor.

3. The computer-implemented method of claim 1, wherein classifying the test image using the at least one feature extracted by the feature extractor network of the model inference engine and the custom model comprises:
   analyzing the at least one feature by the custom model, wherein the custom model is a verification network that determines whether the at least one feature matches features of each object from the plurality of objects serially until a match is found or until all of the plurality of objects have been analyzed;

receiving an output vector from the custom model, the output vector including a value for the at least one custom tag, the value indicating that the at least one object is the same as an object corresponding to the at least one custom tag; and labeling the test image with the at least one custom tag.

4. A computer-implemented method comprising:

receiving, by a model inference engine, annotated image data, the annotated image data including a plurality of images and corresponding custom tags, the custom tags identifying at least one representation of an object in the plurality of images, the object belonging to a category of a custom set of categories;

extracting, by a feature extractor network of the model inference engine, a plurality of features from the annotated image data, wherein the feature extractor network comprises one or more hidden layers of a base model that has not been trained to identify objects belonging to the category of the custom set of categories, the base model having been trained according to a machine learning training process by processing a base dataset including image data passed to the base model as input data and providing as output from the base model identification of one or more objects, in the image data, belonging to a category of a base set of categories that does not include the category of the custom set of categories; and combining, by a model training engine, the plurality of features extracted by the one or more hidden layers of the base model from the annotated image data with the custom tags identifying objects from the plurality of objects to generate combined training data;

generating a custom model by training the base model using the combined training data.

5. The computer-implemented method of claim 4, further comprising:

receiving an input image;

performing localization on the input image to extract at least one feature from a portion of the input image; and passing, into the custom model, input data comprising the input image and the at least one feature extracted by the feature extractor network of the model inference engine from the portion of the input image to obtain, as output from the custom model, a classification of the input image.

6. The computer-implemented method of claim 5, wherein performing localization on the input image to extract at least one feature from the portion of the input image further comprises:

identifying at least one object in the input image;

associating the at least one object in the input image with a bounding box;

cropping the portion of the input image corresponding to the bounding box; and extracting at least one feature from the portion of the input image using the base model.

7. The computer-implemented method of claim 6, wherein identifying at least one object in the input image includes analyzing the input image using a region proposal network, single-shot detection (SSD), or a fully convolutional network (FCN), which outputs the bounding box.

8. The computer-implemented method of claim 7, wherein the bounding box is greater than a threshold size.

9. The computer-implemented method of claim 5, wherein classifying the input image using the at least one feature extracted from the portion of the input image and the custom model comprises:

processing the at least one feature extracted from the portion of the input image by the custom model to identify a closest neighbor using a k-nearest neighbor algorithm, random forest algorithm, or neural network; and labeling the input image with a custom tag of the custom tags corresponding to the closest neighbor.

10. The computer-implemented method of claim 5, wherein classifying the input image using the at least one feature extracted from the portion of the input image and the custom model comprises:

analyzing the at least one feature extracted from the portion of the input image by the custom model, wherein the custom model is a verification network that determines whether the at least one feature matches features of each object from a plurality of objects serially until a match is found or until all of the plurality of objects have been analyzed;

receiving an output vector from the custom model, the output vector including a value for each of the custom tags in the custom model, each value indicating whether the at least one feature is the same as an object corresponding to the custom tags; and labeling the input image with a custom tag of the custom tags having a highest value of the values of the output vector.

11. The computer-implemented method of claim 5, further comprising:

receiving a plurality of classification vectors, each corresponding to a different portion of the input image, and each classification vector including at least one classification tag and a corresponding confidence value; and pooling the plurality of classification vectors, wherein pooling includes labeling the input image with the at least one classification tag from each classification vector based on the confidence values.

12. The computer-implemented method of claim 11, wherein pooling includes one of maximum pooling, average pooling, or voting.

13. A system comprising:

a model inference engine implemented by a first one or more electronic devices, the model inference engine including instructions that upon execution cause the model inference engine to:

receive annotated image data, the annotated image data including a plurality of images and corresponding custom tags, the custom tags identifying at least one representation of an object in the plurality of images, the object belonging to a category of a custom set of categories, and extract, by a feature extractor network of the model inference engine, a plurality of features from the annotated image data, wherein the feature extractor network comprises one or more hidden layers of a base model that has not been trained to identify objects belonging to the category of the custom set of categories, the base model trained according to a machine learning training process by processing a base dataset including image data passed to the base model as input data and providing as output from the base model identification of one or more objects, in the image data, belonging to a category of a base set of categories that does not include the category of the custom set of categories; and a model training engine implemented by a second one or more electronic devices, the model training engine including instructions that upon execution cause the model training engine to:

combine the plurality of features extracted by the one or more hidden layers of the base model from the annotated image data with the custom tags identifying objects from the plurality of objects to generate combined training data; and generate a custom model by training the base model using the combined training data.

14. The system of claim 13, wherein the model inference engine includes further instructions that upon execution cause the model inference engine to:

receive an input image;

perform localization on the input image to extract at least one feature from a portion of the input image; and pass, into the custom model, input data comprising the input image and the at least one feature extracted by the feature extractor network of the model inference engine from the portion of the input image to obtain, as output from the custom model, a classification of the input image.

15. The system of claim 14, wherein the instructions to perform localization on the input image to extract at least one feature from the portion of the input image further cause the model inference engine to:

identify at least one object in the input image;

associate the at least one object in the input image with a bounding box;

crop the portion of the input image corresponding to the bounding box; and extract at least one feature from the portion of the input image using the base model.

16. The system of claim 15, wherein the instructions to identify at least one object in the input image further cause the model inference engine to:

analyze the input image using a region proposal network, single-shot detection (SSD), or a fully convolutional network (FCN), which outputs the bounding box.

17. The system of claim 16, wherein the bounding box is greater than a threshold size.

18. The system of claim 14, wherein the instructions to classify the input image using the at least one feature extracted from the portion of the input image and the custom model, further cause the model inference engine to:

process the at least one feature extracted from the portion of the input image by the custom model to identify a closest neighbor using a k-nearest neighbor algorithm, random forest algorithm, or neural network; and label the input image with a custom tag of the custom tags corresponding to the closest neighbor.

19. The system of claim 14, wherein the instructions to classify the input image using the at least one feature extracted from the portion of the input image and the custom model, further cause the model inference engine to:

analyze the at least one feature extracted from the portion of the input image by the custom model, wherein the custom model is a verification network that determines whether the at least one feature matches features of each object from a plurality of objects serially until a match is found or until all of the plurality of objects have been analyzed;

receive an output vector from the custom model, the output vector including a value for each of the custom tags in the custom model, each value indicating whether the at least one feature is the same as an object corresponding to the custom tags; and label the input image with a custom tag of the custom tags having a highest value of the values of the output vector.

20. The system of claim 14, wherein the model inference engine includes further instructions that upon execution cause the model inference engine to:

receive a plurality of classification vectors, each corresponding to a different portion of the input image, and each classification vector including at least one classification tag and a corresponding confidence value; and pool the plurality of classification vectors, wherein pooling includes labeling the input image with the at least one classification tag from each classification vector based on the confidence values, wherein pooling includes one of maximum pooling, average pooling, or voting.

* * * * *